US012749134B2

(12) United States Patent
Caballero

(10) Patent No.: US 12,749,134 B2
(45) Date of Patent: Sep. 29, 2026

(54) SYSTEM AND METHOD FOR ACQUISITION AND MANAGEMENT OF DATA FOR MULTIPLE LISTING SERVICES

(71) Applicant: Ben Caballero, Frisco, TX (US)

(72) Inventor: Ben Caballero, Frisco, TX (US)

( * ) Notice: Subject to any disclaimer, the term of this patent is extended or adjusted under 35 U.S.C. 154(b) by 0 days.

(21) Appl. No.: 16/878,595

(22) Filed: May 19, 2020

(65) Prior Publication Data

US 2021/0366058 A1 Nov. 25, 2021

(51) Int. Cl.

*G06Q 50/16* (2024.01)
*G06F 16/29* (2019.01)
*G06F 16/9535* (2019.01)
*G06F 16/9537* (2019.01)
*G06F 16/9538* (2019.01)
*G06F 40/174* (2020.01)
*G06F 40/221* (2020.01)
*G06Q 10/10* (2023.01)

(52) U.S. Cl.

CPC ............. *G06Q 50/16* (2013.01); *G06F 16/29* (2019.01); *G06F 16/9535* (2019.01); *G06F 16/9537* (2019.01); *G06F 16/9538* (2019.01); *G06F 40/174* (2020.01); *G06F 40/221* (2020.01); *G06Q 10/10* (2013.01)

(58) Field of Classification Search

None

See application file for complete search history.

(56) References Cited

U.S. PATENT DOCUMENTS 11,244,412 B1 * 2/2022 Phillips .............. G06Q 30/0621
2007/0061774 A1 * 3/2007 Chan ...................... G06Q 10/06 717/101
2007/0219712 A1 * 9/2007 Abhyanker ............ G06Q 10/10 701/532
2008/0172393 A1 * 7/2008 Baird ..................... G06Q 30/02
2011/0288969 A1 * 11/2011 Wiech ...................... G06F 16/20 705/30
2019/0114727 A1 * 4/2019 Spath ................. G06Q 30/0282
2019/0378226 A1 * 12/2019 Costello ............. G06Q 30/0242

* cited by examiner

*Primary Examiner* — Nathan C Uber
(74) *Attorney, Agent, or Firm* — H. Artoush Ohanian; OhanianIP

(57) ABSTRACT

In one or more embodiments, a system and method for acquiring and managing new home data and corresponding multiple listing service listings includes a database for storing plan profiles, geographical community profiles, MLS listing records, builder profiles, and MLS metadata. A dashboard generator produces a dynamic web-based dashboard operable to provide access to the plan, builder and community profiles and the MLS records for adding, viewing or updating records by a homebuilder. A listing generator pre-populates MLS listing fields with data extracted from the plan, builder, and community profiles. A posting engine transfers new and updated MLS listings to an MLS. Homebuilders may provide an extensible markup language data feed for further pre-population and automation of MLS listings.

20 Claims, 7 Drawing Sheets

Builders

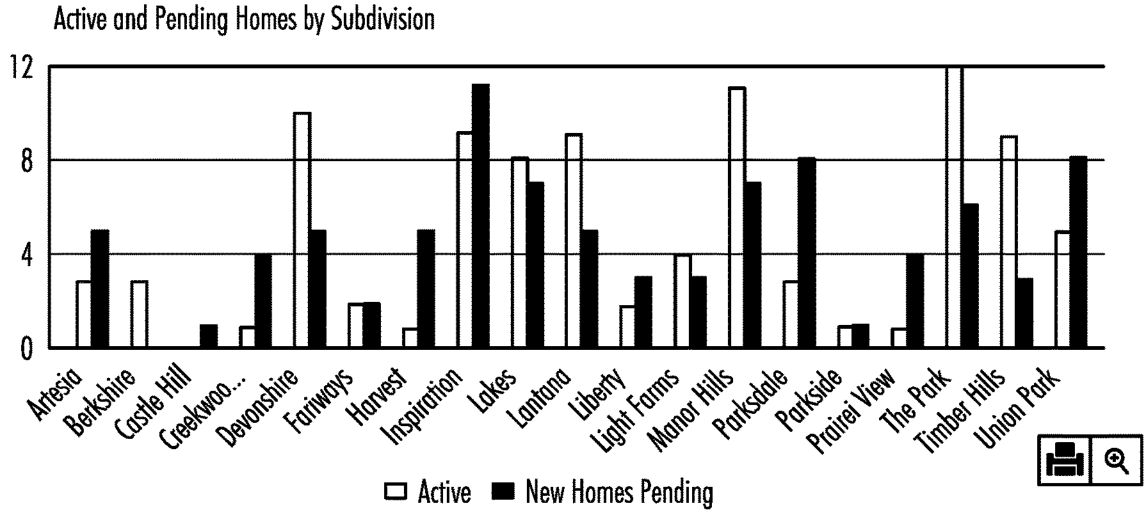

Estimated Closing - 7 Days or Less

| Row | MLS# | Market | Builder | Subdivision | Address | Status | Est. Closed Date | Last User |
|---|---|---|---|---|---|---|---|---|
| 1 | 13284567 | DFW | Highland | Union Park | 765 Field Crossing | PND | 06/16/20 | D. Jones |
| 2 | 13330798 | DFW | Highland | Liberty | 123 Elm St. | PND | 06/17/20 | A. Smith |
| 3 | 13263526 | DFW | Highland | Creekwood 65s | 641 Mangrove | PND | 06/17/20 | D. Franklin |
| 4 | 13334150 | DFW | Highland | Prairie View | 3223 Denali | PND | 06/17/20 | D. Jacobs |
| 5 | 13274503 | DFW | Highland | Parkside East | 340 3rd St. | PND | 06/17/20 | F. Johnson |
| 6 | 13354572 | DFW | Highland | Liberty | 320 James Rd. | PND | 06/20/20 | M. Williams |
| 7 | 13303573 | DFW | Highland | Lantana | 1220 Briscoe | PND | 06/21/20 | A. Smith |
| 8 | 13304574 | DFW | Highland | Creekwood 65s | 704 Mangrove | PND | 06/22/20 | D. Jones |

Completion Date Due in 7 days or Less

| Row | MLS# | Market | Builder | Subdivision | Address | Status | Est. Closed Date | Last User |
|---|---|---|---|---|---|---|---|---|
| 1 | 13279603 | DFW | Highland | Lantana | 1417 Bluebell | PND | 06/15/20 | H. Collins |
| 2 | 13284824 | DFW | Highland | Union Park | 357 Jones | PND | 06/17/20 | F. Johnson |
| 3 | 13388290 | DFW | Highland | Light Farms | 3120 Elm | PND | 06/18/20 | D. Jones |
| 4 | 13361707 | DFW | Highland | Lantana | 8424 Cholla | PND | 06/21/20 | H. Collins |

Inadequate Property Remarks

| Row | MLS# | Modified On | Address | Public Remarks |
|---|---|---|---|---|
| 1 | 13346660 | 03/29/20 | 337 Jones | For comparable purposes only |
| 2 | 13350499 | 04/26/20 | 9213 Garden St. | Lovely one story, 2 bedrooms, 2 baths, extended outdoor living area |

FIG. 5A

Sales by Builders

Monthly Salves vs Average DOM

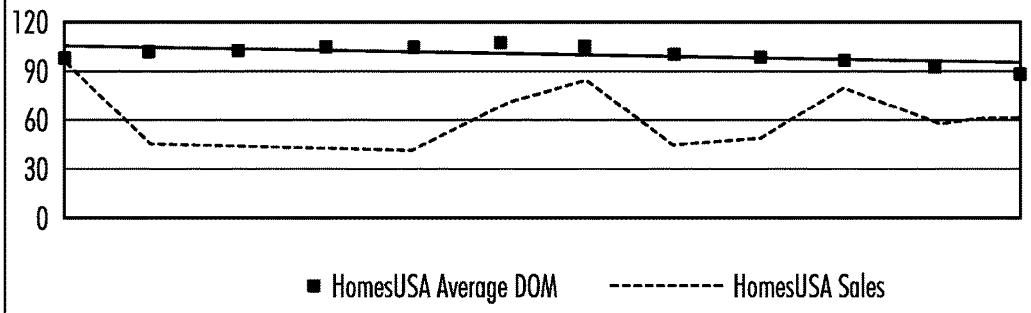

Past Due Estimated Closing Date

| Row | MLS# | Market | Builder | Subdivision | Address | Status | Est. Closed Date | Last User |
|---|---|---|---|---|---|---|---|---|
| 1 | 13290551 | DFW | Highland | Harvest 50s | 1517 8th. St. | PND | 06/13/20 | A. McMellon |

Past Due Estimated Completion Date

| Row | MLS# | Market | Builder | Subdivision | Address | Status | Est. Completion Date | Last User |
|---|---|---|---|---|---|---|---|---|
| 1 | 13380170 | DFW | Highland | Lantana | 9332 Katlyn | ACT | 06/20/20 | Bxl User |
| 2 | 13279326 | DFW | Highland | Lantana | 9216 Katlyn | PND | 06/13/20 | H. Collins |

Completed Homes Without Actual Photos

| Row | MLS# | Market | Builder | Subdivision | Address | Status | Completion Date | Last User |
|---|---|---|---|---|---|---|---|---|
| 1 | 13287021 | DFW | Highland | Prairie View | 1113 Garden Ave. | ACT | 05/31/20 | Bxl User |
| 2 | 13398821 | DFW | Highland | Whitley Place | 361 Booker | ACT | 06/01/20 | G. Yager |

FIG. 5B

SYSTEM AND METHOD FOR ACQUISITION AND MANAGEMENT OF DATA FOR MULTIPLE LISTING SERVICES

BACKGROUND

A multiple listing service (MLS) is a suite of services used by real estate brokers representing property sellers under a listing contract to widely share information about properties with other brokers who may represent potential buyers or wish to work with a seller's broker in finding a buyer for the property or asset.

MLS systems exist in many countries throughout the world. There is no single authoritative MLS in the United States; as of 2019, there were 640 individually operated MLS providers. In the United States, MLS systems are governed by private entities, and the rules are set by those entities with no state or federal oversight, beyond any individual state rules regarding real estate. An MLS may be owned and operated by a real estate company, a county or regional real estate board of realtors or association of realtors, or by a trade association. Listings disseminated through a MLS may be controlled by a single association of realtors or groupings of associations which represent all brokers within a given community or area.

MLS systems set their own rules for membership, access, and sharing of information. Most MLS providers restrict membership, and full, uninhibited access to their MLS database is only provided to real estate brokers and agents who are appropriately licensed, are members of a local board or association of realtors, and are members of an applicable national trade association (e.g., the National Association of Realtors®).

Brokers may be allowed to show limited MLS information on their websites via an authorized internet data exchange (IDX) service, and most MLS providers offer the public the ability to view limited portions of MLS listings over the internet, either on a website hosted by the MLS provider itself or on third-party websites such as Realtor.com® and the like. These data-restricted websites typically have a limited ability in terms of reviewing comparable properties, past sales prices or monthly supply statistics.

Most MLS database systems provide a comprehensive set of fields, generally based on recommendations of the National Association of Realtors,® for describing a property, including the following categories: Listing type and status, marketing information, showing times and details, listing price, listing date, contract and financing information, broker and agent details, property address and legal description, neighborhood and other geographic information, school districts, lot size and features, property tax and association fees, utilities, house size, floor plan details, number of rooms, room sizes, construction details, appliances, amenities, photographs, and the like. MLS listing requirements typically mandate several hundred fields to be completed before the listing will be posted, and violations of MLS rules may be subject to a fine. Typically, it may take up to 45 minutes or more to manually enter the information in the fields of an MLS listing, even when all the required information is at hand.

For example, most MLS systems allow speculative homes to be listed early in the construction process, and changes to the MLS listing to reflect current property status are required to be made within specific time periods. Such changes may include differences due to change orders during construction, current listing price, sales status, completion dates, and posting of photography upon completion.

For a production homebuilder with scores or hundreds of homes under construction at any given time in multiple geographies, and often under the "jurisdiction" of a number of somewhat disparate MLS providers, it is difficult to manage its portfolio of new home MLS listings efficiently, particularly via manual entry and updating. It is desirable, therefore, to provide a system and method for managing new home data and corresponding MLS listings that addresses and overcomes the above-mentioned shortcomings.

BRIEF DESCRIPTION OF THE DRAWINGS

Many aspects of the present disclosure can be better understood with reference to the following drawings, in which:

FIG. 5A and FIG. 5B are illustrations of portions of a report produced by the system of FIG. 1 via the dashboard display of FIG. 2 according to one or more embodiments.

The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
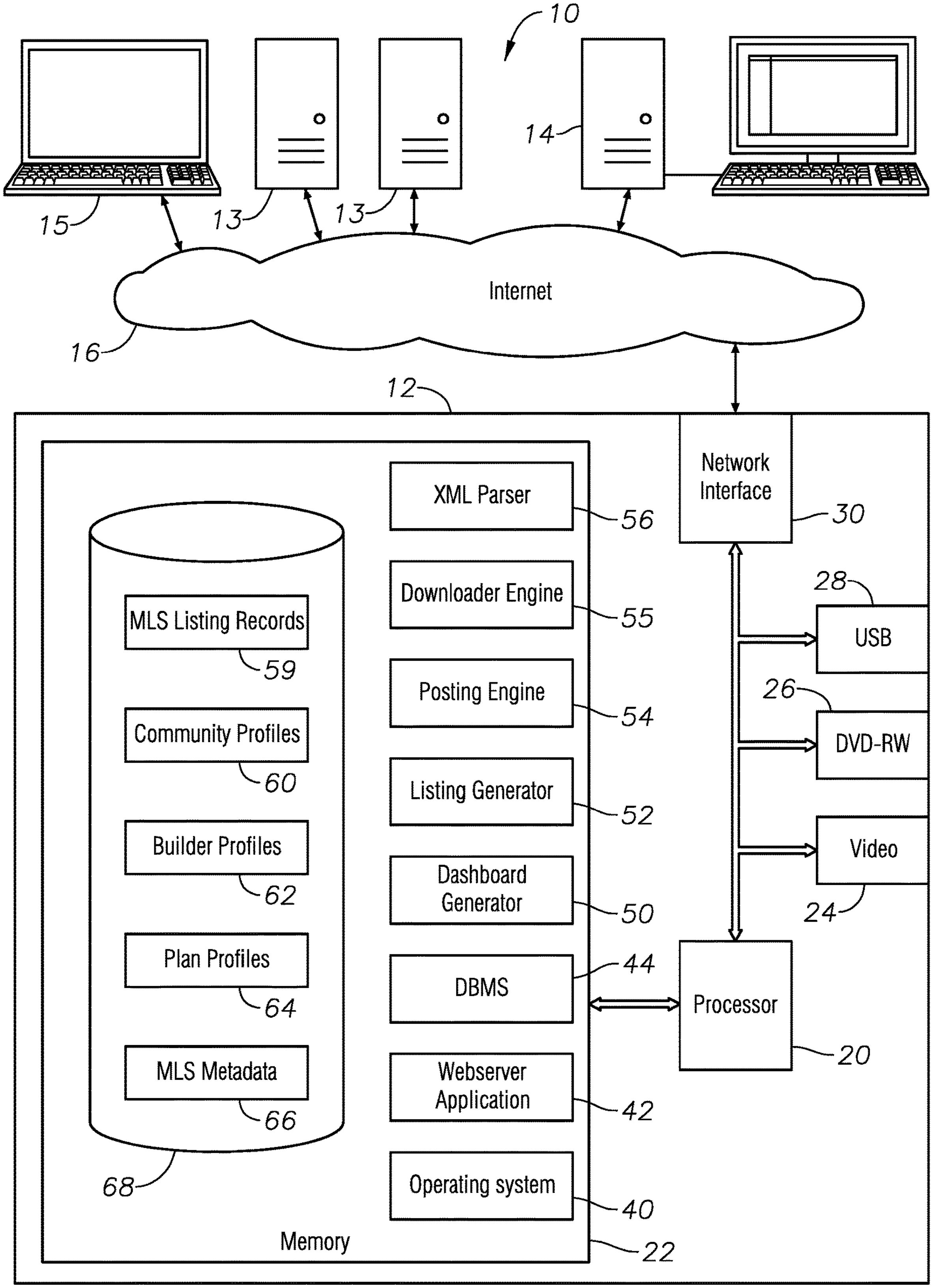
FIG. 1 is a conceptualized block diagram of a system for acquiring and managing new home data and corresponding MLS listings according to one or more embodiments.

FIG. 1 is a conceptualized block diagram of a system 10 for acquiring and managing new home data and corresponding MLS listings according to one or more embodiments. MLS listing management system 10 includes a server 12 that handles incoming and outgoing internet-based communications with one or more MLS systems and clients such as multi-market volume homebuilders.

As described in greater detail below, MLS listing management system 10 provides a suite of web-based management tools to clients via a dashboard 100 displayed in a web browser application running on a client's computer 14. The client is able to generate new listings, review and update current listings, and generate numerous reports about listings using dashboard 100. MLS listing management system 10 may accelerate the process of manually entering new listings by using a number of profiles and/or XML data feeds to accurately pre-populate data fields, and system 10 provides quality assurance by performing comprehensive listing data validation. New listings are then uploaded by server 12 to an appropriate MLS system server 13. Realtors®, real-estate agents, brokers, and, to a limited extent, the general public may access MLS data on MLS servers 13 via a computer 15 via the internet 16.

Server 12 is preferably a high-capacity web server that hosts one or more web server software applications for selectively, securely and efficiently managing a large number of MLS listings. Server 12 preferably has the memory capacity and redundant functional capabilities of at least a powerful rack-mount or desktop server computer to support a large number of concurrent processes and maintain high-throughput communications, and more preferably still, is sufficiently capable to support several hundred concurrent client connections. As known in the art, server 12 may be equipped with a local display monitor and input keyboard, keypad, and/or input pointing device (not illustrated) for interfacing with a local system administrator. As known by one skilled in the art, server 12 may consist of a single computer server or multiple computer servers. Server 12 may include one or more dedicated servers, server services provided via a cloud infrastructure, other architecture either extant or yet to be developed for executing software, or a combination of the above.

As is well known in the computer field, server 12 preferably contains at least one processor 20 which executes instructions retrieved from one or more memory devices, possibly random access memory (RAM), read only memory (ROM), and a hard disk drive (collectively memory 22) to control the reception and manipulation of input data, the transfer of data to other computers, and the output and display of data on output devices. A high-speed memory bus is used by the processor to access RAM and, optionally, other high-speed memory elements. Memory 22 is used for storing input data, processed data, and software in the form of processor instructions. Processor 22 is coupled via one or more peripheral buses to access input, output and storage devices, possibly including a video display chip/card 24, a removable disc drive 26 (e.g. DVD-RW), universal serial bus (USB) 28, and a network interface 30. As this general computer technology is commonplace and well understood in the art, it is neither illustrated nor discussed further herein.

Server 12 includes computer software as an integral part. The computer software includes an operating system (OS) 40, a web server application 42, and a database management system (DBMS) 44, which may be commercially available. The computer software also includes custom code written to implement the processes discussed herein, including in one or more embodiments a dashboard generator 50, a listing generator 52, a posting engine 54, a downloader 55, and a XML parser 56. Dashboard generator 50, listing generator 52, posting engine 54, downloader 55, and XML parser 56 may be implemented as automated computing machinery and defined using any suitable computer language, including PHP, C++, Perl, shell scripts and the like, as known to routineers in the art. Finally, the computer software may also include an optional web browser application, an optional network firewall application, and other applications and utilities. The computer software may reside in RAM, ROM, hard disk drives, removable storage media, or combinations thereof. Additionally, one or more components of the computer software may be stored at a separate computer (not illustrated) and accessed over a network.

Although dashboard generator 50, listing generator 52, posting engine 54, downloader 55, and XML parser 56 are illustrated in FIG. 1 as being separate software modules executed on a common server, one skilled in the art will recognize that these software modules may reside on and be executed by independent hardware platforms. Similarly, a routineer in the art will also recognize that the compartmentalization of the software into dashboard generator, listing generator, posting engine, downloader engine, and XML parser modules is for purposes of providing clarity; in practice, dashboard generator 50, listing generator 52, posting engine 54, downloader 55, and XML parser 56 may exist as discrete software modules, or they may be combined or divided into any number of software modules that perform the functions described herein. Additionally, although embodiments are described herein as implemented on dedicated server 12, a routineer in the art will recognize that with the evolution of technology and the implementation of cloud computing server 12 may be implemented by one or multiple services running over a cloud infrastructure without the need of a discrete server allocation in what may be referred to as "serverless architecture."

Operating system 40, which controls computer resources, peripherals, and the execution of software applications for server 12, is preferably an industry-standard multiuser multitasking web server OS such as an open source Linux® variant or a Windows® Server OS. Other appropriate operating systems may also be used. As OS technology is commonplace and well understood in the art, the operating system is not discussed further herein.

Web sever application 42, which is often bundled with OS 40, enables external computer systems access to server 12, via hypertext markup language (HTML) GET or POST commands or file transfer protocol (FTP), for example. Apache is a popular open source hypertext transport protocol (HTTP) web server application that is used with Linux,® Windows® and other operating systems, and Internet Information Services (IIS) is an extensible web server software application created by Microsoft® for use with the Windows® NT family of operating systems. Utilizing standard ethernet transmission control protocol/internet protocol (TCP/IP) networking techniques, server 12 is connected to the internet 16. With communications managed by web server application 42, server 12 is accessible via a static internet protocol (IP) address from devices having internet access located anywhere in the world. Web server applications are commonplace and well known in the art and accordingly are not discussed further herein.

MLS listing management system 10 stores historical and current MLS listing records and geographical, builder, and MLS system data. Accordingly, server 12 ideally includes DBMS 44 in order to simplify the organization, analysis and handling of the large amount of data. In one embodiment, server 12 also functions as a database server in addition to its role as a web server. However, with a large number of concurrent client connections, to enhance scalability and performance it may be preferable to host DBMS 44 on a dedicated database server (not illustrated), as understood by routineers in the art.

Database management system 44 may be implemented using a common DBMS application suite, as most modern commercially-available DBMS applications are full-featured, robust, scalable, and easy to use. In one or more embodiments, DBMS 44 employs a relational database model, in which data is organized in the form of tables. The relational data model was introduced in 1970 by E. F. Codd of International Business Machines IBM, and it has continued to evolve. Relational databases are organized around a mathematical theory that aims to maximize flexibility. The relational data model consists of three components: A data structure wherein data are organized in the form of tables; a series of relational functions and operators for manipulating data stored in the tables, e.g. structured query language (SQL); and means for ensuring data integrity in conformance with business rules. Many relational database management systems (RDBMS) exist, such as Oracle,® MySQL and DB2® from IBM. Relational database systems offer scalability and architectural flexibility to provide robust database solutions that perform, adapt and respond to today's business initiatives.

In one or more embodiments, DBMS 44 preferably provides geodatabase functionality, for storing and implementing community profiles, as described below. A geodatabase (also referred to as a geographical database or a geospatial database) is a spatial database—a database that is optimized for storing and querying data that represents objects defined in a geometric space—of geographic data, such as countries, administrative divisions, cities, and other spatially-related information. Most spatial databases allow the representation of simple geometric objects such as points, lines and polygons, while some handle more complex structures such as three-dimensional objects, topological coverages, linear networks, and triangulated irregular networks.

At its most basic level, a geodatabase is a collection of geographic datasets of various type for use in a relational database. The geodatabase storage model is based on a series of simple yet essential relational database concepts that leverages the strengths of the underlying RDBMS. Simple tables and well-defined attribute types are used to store schema, rule, base, and spatial attribute data for each geographic dataset. This approach provides a formal model for storing and working with spatial data. Through this approach, SQL can be used to create, modify, and query tables and their data elements.

A typical off-the-shelf RDBMS, developed to manage various numeric and character types of data, requires additional functionality to process spatial data types efficiently. Some, including Oracle,® MySQL and DB2® mentioned above, optionally offer extended geometry or feature data types to support basic spatial applications. Spatial representations, most commonly represented by vectors or raster arrays, are generally stored using such an extended spatial data type.

Robust geodatabases, on the other hand, have a comprehensive information model for representing and managing geographic information, which may be implemented as a series of tables holding feature classes, raster datasets, and attributes. They may provide integration with advanced geographic information system (GIS) data objects, rules for managing spatial integrity, and tools for working with numerous spatial relationships, shapefiles, computer-aided drafting (CAD) data, triangulated irregular networks (TINs), grids, imagery, Geography Markup Language (GML) files, and numerous other GIS data sources.

MLS listing management system 10 may include a network firewall (not illustrated) to protect it from unauthorized intrusion and computer hacking efforts. The firewall may be a firewall software application executed by server 12, or it may be a discrete and independent hardware firewall operatively coupled between the server 12 and internet 16. Regardless of the type of firewall installed, the firewall provides controlled access to server 12 using multiple recognized network security methods such as user and password challenges, VPN access, filtered IP address access, et cetera. In other words, server 12 is secured to eliminate unauthorized access the same way that an ordinary computer is protected using existing or future common network security products. As network firewalls are well known in the art, further detailed discussion is omitted.

Web server application 42 functions by listening for connections made by devices over internet 16 and thereafter by selectively transmitting data to the requestor. Dashboard generator 50 is a suite of custom software programs and files that work hand-in-hand with web server application 42 to implement a graphical user interface (GUI) dynamic dashboard display 100 on remote client computer 14 for use by homebuilders and other clients according to one or more embodiments of the invention. Specifically, dashboard generator 50 and web server application 42 together generate an interactive dynamic website interface 100 that may accessed by clients via a web browser on a remote computer device to create, review, update and manage listings and generate reports, as described below.

In one or more embodiments, dashboard generator 50 preferably includes a family of HTML and cascading style sheet (CSS) form files disposed in a web page directory accessed by web server application 42, and a series of Common Gateway Interface (CGI) shell scripts or compiled programs, disposed in a cgi-bin or like directory, that are selectively executed in response to an HTML FORM command in order to transform otherwise static HTML form files into dynamic website interface 100 when displayed in a web browser running on remote client computer 14. Shell scripts or compiled programs of dashboard generator 50 may be defined using any suitable computer language, including PHP, C++, Perl, Bourne shell scripts and the like, as known to routineers in the art.

Dashboard generator 50 ideally employs standard windows-type display and control mechanisms including windows, client windows, frames, flexboxes, icons, buttons, check boxes, radio buttons, scroll bars, drop-down menus, pull-down menus, drill-down mechanisms, tabs, bar graphs, panes, panels, forms, slide bars, selection boxes, dialog boxes, text boxes, list boxes, menu bars, bar graphs, wizards, et cetera. The selection and layout of the user interface components, and the placement thereof, may vary widely within the scope of the present disclosure and may optionally be customized by each user. Ideally, dashboard generator 50 employs responsive site design techniques so as to automatically adjust layout and design to be readable and usable at any screen width. As user interface programming and design are well known in the art, further detail is omitted.

Web server application 42 and dashboard generator 50 cooperate to provide secure remote internet access to server 12. Web server application 42 provides initial login access to remote computer device 14 via an initial or default HTML file that prompts the user for a username and password or other identifier; a homebuilder or other client may enter login credentials and thereby obtain an instance of website interface 100 that is populated with that builder's custom data, e.g., the data associated with the builder's MLS listings and house plans.

Figure 2:
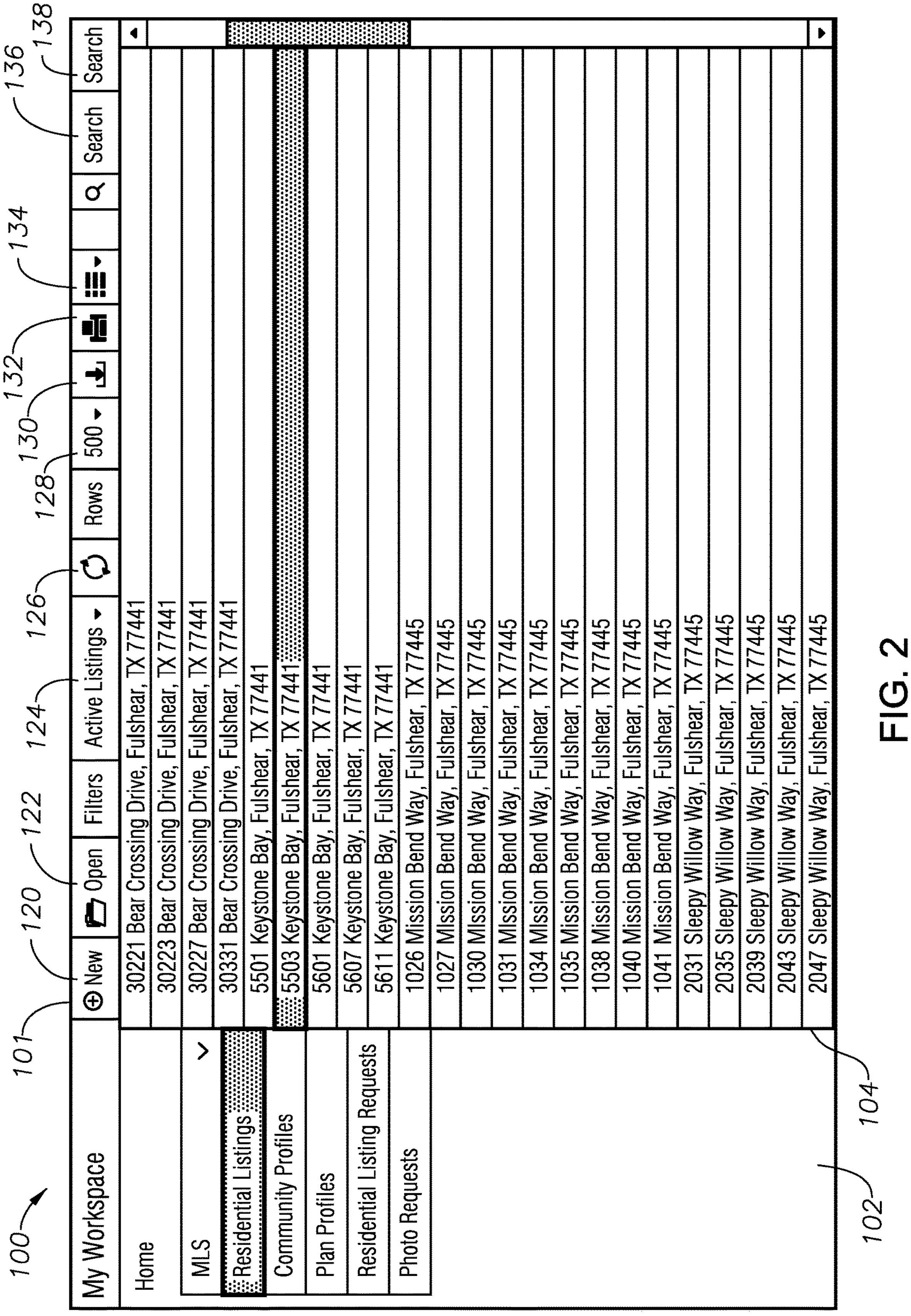
FIG. 2 is an illustration of an instance of a dynamic web-based dashboard display produced by the system of FIG. 1 according to one or more embodiments, showing the functionality of selectively displaying a list of records.

FIG. 2 is a view of an exemplary dashboard 100 generated by dashboard generator 50 according to one or more embodiments. Referring to FIG. 2, dashboard 100 may include an upper level window 101 having an upper level navigation pane 102 and a listing pane 104. Upper level navigation pane 102 allows selection of the upper level functionality of website interface 100, i.e., it determines what contents are displayed in listing pane 104. In one or more embodiments, upper level navigation pane 102 will include potential selections including residential listings, community profiles, and plan profiles, as described in greater detail hereinafter. Other potential selections may also be included within upper level navigation pane 102. For instance, in FIG. 2, the "Residential Listings" option is selected (as shown by reverse-video highlighting) within upper level navigation pane 102, resulting in listing pane 104 displaying a list a of MLS listings. A user of dashboard 100 may select, using a pointing device, an entry from the list displayed in listing pane 104 for further action. For instance, in FIG. 2, the selected entry "5503 Keystone Bay" is indicated by reverse-video highlighting.

Upper level window 101 may also include various dynamic icon or text buttons that allow a user to open, save and close records, create new records, search for and select records, delete records, submit records for processing, and the like. Dashboard generator 50 cooperates with DBMS 44 to store and manipulate records in database 68. As described in greater detail below, records may include MLS listing records 59, community profiles 60, builder profiles 62, plan profiles 64, and MLS metadata 66. Although FIG. 1 shows community profiles 60, builder profiles 62, plan profiles 64, MLS metadata 66, and MLS listing records 59 as stored in a common database 68, one skilled in the art will recognize that more than one database may be used to store and manipulate the various profile data. For instance, each profile may be stored as a separate database.

FIG. 2 illustrates a button 120 for creating a new record (in this case, because upper level navigation pane 102 is selecting residential listings, a new MLS residential listing), a button 122 for opening a selected record, a pull-down menu 124 for filtering the types of listings displayed, a button 126 for reversing the sorting order of the records, a pull-down menu 128 for selecting the number or records that are displayed at a time, a button 130 for downloading the list of records to a file, a button 132 for printing the list, a button 134 for what data is displayed in the list for each record (e.g., address, neighborhood, et cetera), a text box 136 for entering search criteria, and a button 138 to execute a record search. Other functionality may be added as known to routineers in the art. If the list of displayed records is too long to fit within listing pane 104, a scroll bar 140 may be used to allow the user to selectively view the records within the list.

Figure 3:
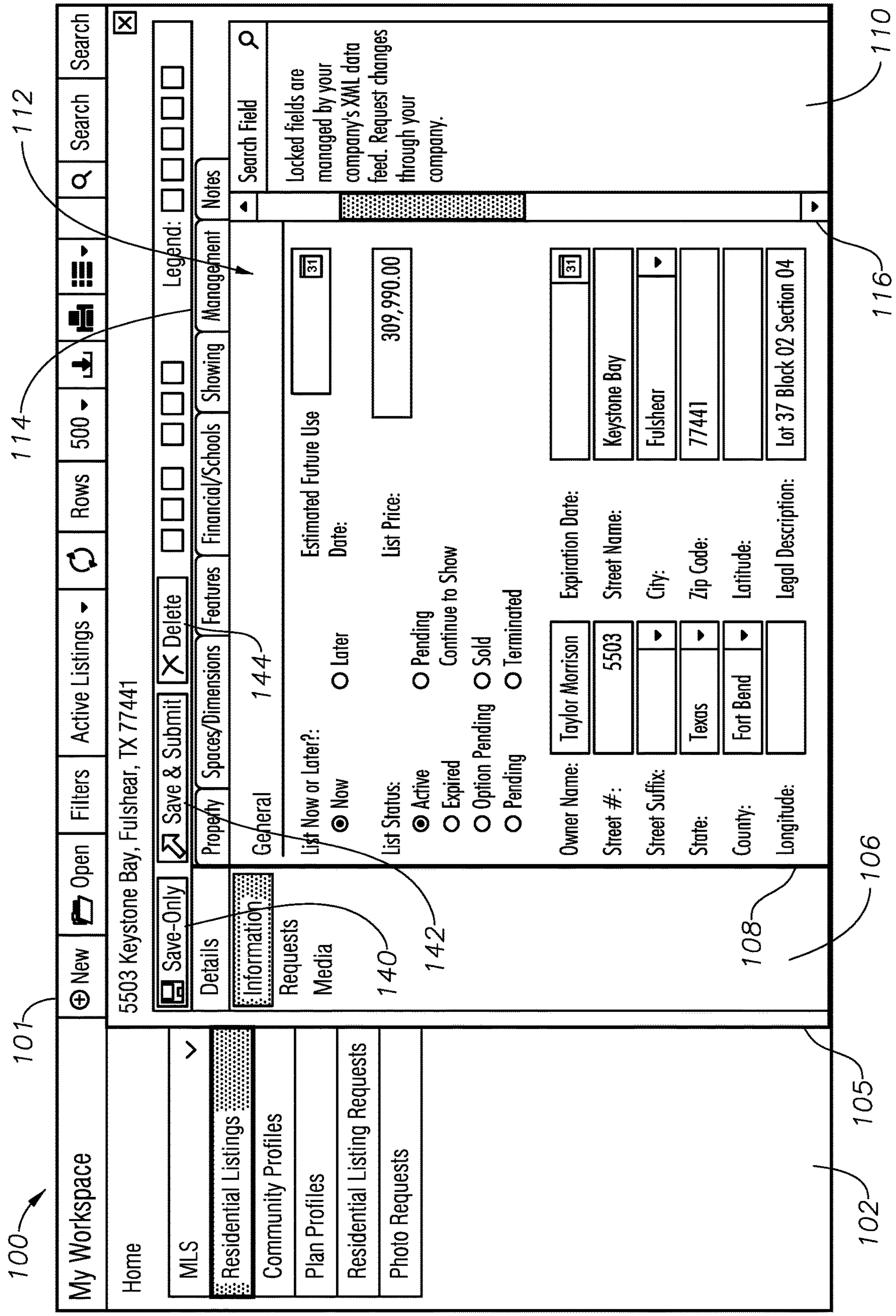
FIG. 3 is an illustration of the dashboard display of FIG. 2 according to one or more embodiments, showing the functionality of displaying data of a selected record at a granular level for review and/or update.

When a user opens a record from the list displayed in listing pane 104, either by selecting the record and clicking on open button 122 or by double-clicking on an entry, dashboard 100 will open a client window 105. FIG. 3 illustrates client window 105 populated with data for the record selected in listing pane 104 of FIG. 2, superimposed on top of a portion of upper level window 101.

Referring to FIG. 3, client window 105 dynamically displays forms and/or information associated with creating or updating the selected record, in this case an MLS residential listing. Client window 105 may include a client window navigation pane 106, a main pane 108, and an auxiliary pane 110. Client window navigation pane 106 may control the type of contents displayed in a main pane 108. Main pane 108 may define a working region 112, in which one or more forms, dialog boxes, or display boxes may be presented to the user of dynamic website interface 100. Main pane 108 may also include a plurality of tab operators 114, which may provide a much higher level of granularity of the contents displayed in working region 112 than provided by client window navigation pane 106. For instance, in FIG. 3, the "Information" option is selected (as shown by reverse-video highlighting) within client window navigation pane 106, resulting in working region 112 displaying tabs 114 defining various categories of MLS residential listing information, such as property details, dimensions, features, schools, et cetera. The "Property" tab 114 is selected, and working region 112 displays a form with radio buttons, text boxes, selection boxes, and the like by which the user can enter, review, and/or update listing information in the various MLS fields related to property information for the selected listing. Because the form displayed in working region 112 in FIG. 3 is too large to fit within client window 104, working region 112 further includes a scroll bar 116 that allows the user to control what part of the form is visible at any given time. Auxiliary pane 110 may be used to provide selected information to the user, including information related to the field in which the user is entering data, such as the type of data accepted, syntax, and the like. The widths of the navigation, main and auxiliary panes within client window 104 may be adjusted by the user by dragging the frames defining the panes, as well known in the art. Client window 104 may also include various icon or text buttons that allow the user to save, delete and submit for processing the selected record. Other functions may also be included as known by routineers in the art. FIG. 3 illustrates a "Save-Only" button 140, a "Save & Submit" button 142, and a "Delete" button 144.

FIG. 3 illustrates client window 105 populated with data for the MLS listing selected from the list displayed in listing pane 104 of FIG. 2. Should the user select a new record by clicking new button 122 rather than selecting an existing record, then the instance of client window 105 that dashboard generator 50 launches would initially be unpopulated. As the user enters data, dashboard generator 50, working with listing generator 52, operates to pre-populate as much data as possible, as described below. Pre-population of data may greatly simplify the process of creating new MLS listings and ensure quality assurance.

FIGS. 2 and 3 illustrate functionality for adding, viewing and updating residential MLS listings. However, should the user select "Community Profiles" on upper level navigation pane 102, a list of community profile records (not illustrated) is displayed in listing pane 104. A new community profile record may be added, or an existing community profile record may be selected in a manner similar to that of MLS listing records as described above. Adding or selecting a community profile record causes dashboard generator 50 to launch a client window 105 having forms for creating or editing community profile records. Likewise, client window 105 may include a navigation pane, an auxiliary pane, tab elements and the like. Community profiles are used by listing generator 52 to pre-populate MLS listing fields and to validate the data, as described below.

Similarly, should the user select "Plan Profiles" on upper level navigation pane 102, a list of plan profile records (not illustrated) is displayed in listing pane 104. A new plan profile record may be added, or an existing plan profile record may be selected in a manner similar to that of MLS listing records as described above. Adding or selecting a plan profile record causes dashboard generator 50 to launch a client window 105 having forms for creating or editing plan profile records. Likewise, client window 105 may include a navigation pane, an auxiliary pane, tab elements and the like. Plan profiles are used by listing generator 52 to pre-populate MLS listing fields and to validate the data, as described below.

Referring back to FIG. 1, listing generator 52 cooperates with dashboard generator 50 to validate MLS listing data and pre-populate MLS listing fields. As a user exits a given HTML form field in dynamic dashboard 100, such as when entering MLS listing data, dashboard generator 50 receives the form data and passes the form data to listing generator 52 for processing. Listing generator uses community profiles 60, builder profiles 62, plan profiles 64, and/or MLS metadata 66, stored in a database 68, to intelligently populate and validate MLS listing data.

Much of the data of an MLS listing depends on geography, i.e., the geographic location in which the real property exists. For instance, some MLS systems require the school district to be specified; other MLS systems may also require public elementary, middle, and high schools servicing the property to be listed. The public schools and school districts are defined geographically. Similarly, differing neighborhoods offer differing amenities, such as community pools, parks, tennis courts, boat ramps, and the like. Homeowners' Associations (HOAs) may impose various restrictive covenants and assess different annual fees, for example. If in city limits, certain zoning laws may apply. Geography also determines what utilities a property may have available, such as natural gas, sewer, water, and internet. And, because many MLS systems require ad valorem tax information to be specified, geography determines under what taxing entity jurisdictions the property falls, including county, city, municipal utility district (MUD), and school district. Finally, flood planes, proximity to noise abatement zones (such as airport approaches), landfills and other potential geographically-based nuisances may need to be disclosed on an MLS listing.

Figure 4:
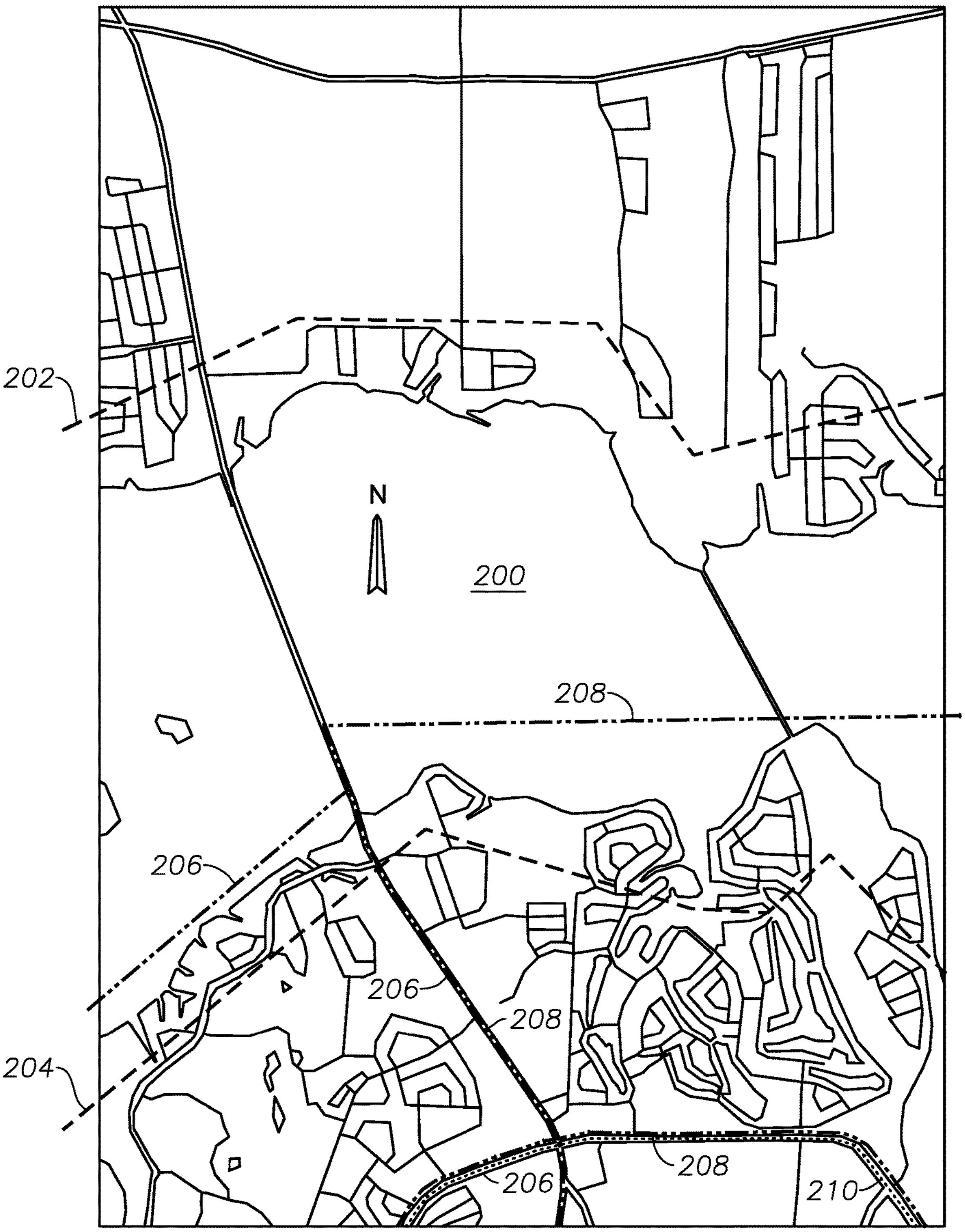
FIG. 4 is a simplified plan view of a portion of the surface of the earth shown with superimposed geographical boundaries to illustrate application of community profiles by the system of FIG. 1 according to one or more embodiments.

In one or more embodiments, community profiles 60 may be defined using geographic datasets stored in database 68. Each community profile record may define a bounded geographic area, such as by metes and bounds definitions or plats defined by the legal name of the subdivision, and one or more associated properties, such as a taxing authority, that applies to real property located within the boundary. FIG. 4 is a simplified plan view of a portion of the surface of the earth, showing a lake 200 bounded to the north and south by various neighborhoods. The streets are illustrated. Dashed lines 202, 204 represent incorporated city boundaries; homes located near lake 200 between lines 202, 204 are subject to city ad valorem taxes. Line 202 may also denote a county boundary line, with homes north of line 202 falling in one country, and homes south of line 202 falling within another county. Accordingly, the county ad valorem taxing authority may be determined. Lake 200 may denote the northern boundary for a municipal utility district; homes located south of lake 200 have water and sewer utilities provided by the MUD and are subject to MUD taxes.

In FIG. 4, neighborhood are demarked using dash-dot lines. A first subdivision on the southwest of the figure is bounded by lines 206; a second subdivision on the southeast of the figure is bounded by lines 208. Each neighborhood may be subject to different HOA fees and provide different amenities. Dotted line 210 represents the northern boundary for a public elementary school, with homes south of line 210 belonging to a different elementary school than homes in the first and second subdivisions north of line 210.

Some community profiles, such as neighborhood amenities and the like, may be created and edited by builders via dashboard 100, as shown in FIG. 2. Other community profiles, such as flood planes, county and city limits, municipal utility districts, and school districts, may be entered and maintained by the administrator of MLS listing management system 10, thereby reducing builder workload in creating MLS listings.

FIG. 4 is a simplified representation that illustrates the function of community profiles 60 according to one or more embodiments. Ideally, community profiles 60 in database 68 includes as many complete community profile records and/or fields as necessary to fully describe a property's geographic parameters for the properties to be listed on an MLS. When a user enters an address on a new MLS listing form, dashboard generator 50 receives the form address data and passes the address to listing generator 52. Listing generator 52 in turn may determine from the address the geographical coordinates, such as by querying a Google Geocoding application programming interface (API) or similar service, and in turn may query community profiles 60 using DBMS 44 to extract geographical parameters, and passes pre-populated fields back to dashboard generator 50 to display in dashboard 100. In cases where geographical coordinates are readily discernable from the address, such as may be the case with new subdivision developments, geographical coordinates may be manually entered by an operator, either by a builder or by the administrator of MLS listing management system 10.

In one or more embodiments, community profiles 60 in database 68 may be used to prepopulate fields of a MLS listing record that depend on the physical location of the real property, but without reliance on defined geographic boundaries. In such embodiments, geodatabase functionality is not required. A community profile 60 may be defined for each builder within a subdivision or subdivision section, as required, that defines all the geographically based data, such as schools, taxing entities, utilities, amenities, flood zones, and the like, for all houses located within that subdivision or subdivision section. Ideally, community profiles 60 in database 68 includes as many complete community profile fields as necessary to fully describe a property's geographic parameters for the properties to be listed on an MLS.

Some of the data on an MLS listing is dependent on a builder's preference. For example, types of financing the builder will accept (conventional, FHA, VA, owner finance, et cetera), and certain finishes (flooring, countertops, appliances, heater and air conditioning, insulation, ceiling fans, et cetera) may be specified by a builder for all of the houses it builds. Such global data may be provided by a builder and stored as builder profiles 62 within database 68. When the builder obtains an instance of dynamic dashboard 100 and creates a new MLS listing, dashboard generator 50 passes the builder identification to listing generator 52. Listing generator 52 in turn queries builder profiles 62 using DBMS 44 to extract builder-specific parameters, and passes pre-populated fields back to dashboard generator 50 to display in dashboard 100.

Although some data is builder-specific for all of the homes the builder builds, most high-volume homebuilders construct homes according to a half-dozen or more floor-plans. Accordingly, some required MLS data is builder floor-plan specific. The builder may directly select the appropriate plan profile 64 that applies to that lot when the builder creates a new MLS listing record. From the appropriate plan profile, listing generator pre-populates fields such as number of floors, garage type, presence or absence of certain types of rooms such as formal dining, great room, sturdy, media room, et cetera, number of bedrooms and bathrooms, room sizes, number of fireplaces, square footage, and the like. Listing generator 52 passes the pre-populated fields to dashboard generator 50 to display in dashboard 100. In addition to floorplan detail, plan profiles 64 may also include photographs or renderings of the exterior of the house, bedrooms, bathrooms, kitchens, and the like.

As noted above, most MLS systems are similar, but different MLS systems may require data in differing formats, have different mandatory requirements, apply different rules and deadlines, and so forth. For this reason, MLS listing management system 10 may include MLS metadata 66, which may be stored in database 68 and may define business rules and/or mapping metadata specific to a particular MLS. Listing generator 52 may query MLS metadata 66 to determine any MLS system specific requirements as it pre-populates and validates fields.

In addition to pre-populating MLS listing fields in dashboard 100, listing engine 52 may provide various data validation, particularly in critical mistake-prone areas. Such validation may include correcting incomplete property descriptions, incorrect garage dimensions, and the like. Pre-population and validation by listing engine 52 increases efficiency by replacing manual processes with technological automation that reduces human error and increases accuracy.

Once a listing is complete and a user clicks on the "Save & Submit" button 142 (FIG. 3), dashboard generator 50 passes the MLS listing data to posting engine 54, which in turn posts the listing to the appropriate MLS system server.

Many MLS systems in the United States and Canada adhere to a, now superseded, data standard—the Real Estate Transaction Standard (RETS), which is a specific and well-defined data exchange protocol for IDX information. RETS was created in 1999 by the National Association of Realtors® and related groups to overcome the difficulties presented by the existence of a large number of organizations desiring to share and distribute real estate information with others. RETS is a specification for a standard communication method between computer systems exchanging real estate information, defining a standard interface for use by applications such as agent desktop software, IDX systems, data aggregation systems, and many other systems that store, display or operate on real estate listing, sales and other data. More particularly, RETS consists of a transaction specification and a standard extensible markup language (XML) document type definition (DTD). A DTD is a set of markup declarations that define an XML document type, i.e., the valid building blocks of an XML document and the document structure with a list of validated elements and attributes. The legacy RETS specification is maintained by and available from the Real Estate Standards Organization (RESO).

In one or more embodiments, posting engine 54 formats the new listing data according to the RETS specification for posting to a MLS system that has not yet migrated from this superseded standard. There is no universal MLS data format; although the implementation of RETS has resulted in some standardization, the field names of the underlying datasets may still vary widely between markets. Accordingly, posting engine 54 may query MLS metadata 66 in database 68 to cross-reference the field names appropriately for the target MLS. This operation may occur just once for each MLS system to initially map MLS fields to MLS listing management system 10. Once appropriately formatted, posting engine 54 uploads the listing data to the MLS.

As noted above, RETS is superseded. In 2018, RESO announced that it planned to retire RETS and replace it with the RESO Web API. To date, many but not all MLS systems have migrated from RETS to RESO Web API. For a RESO Web API-enabled MLS system, listing data is input, updated, deleted, or retrieved using web-based HTTP requests to the API in the uniform resource locator (URL) string. If the target MLS uses RESO Web API, posting engine 54 may initially query MLS metadata 66 in database 68 to determine the required URL syntax for the target MLS and, as necessary, to cross-reference the field names appropriately for the target MLS. Posting engine formats the new listing data as an input request to the API and posts the listing to the MLS.

Multiple other systems exist which support the secure and standardized transfer of datasets and associated access control requirements in a secure and efficient manner, including MySQL. For MLS systems in regions outside North America, posting engine 54 will format the listing data as specified by the target MLS for posting data.

Posting engine 54 may be implemented as proprietary software. However, in one or more embodiments, posting engine 54 may be implemented by one or more third party services, for example via an API. One such service, Remine, may be provided by Remine, Inc. Other such services, either now extant or yet to be developed, may also be used to implement posting engine 54 as appropriate.

MLS listing management system 10 is not necessarily limited to posting new listings. In one or more embodiments, downloading engine 55 may interface with MLS systems 13 via internet 16, using RETS, RESO Web API, or other means as appropriate, to query and retrieve listing data, query statistical data, update specific listings, and similar operations. Downloading engine 55 may receive direct MLS access for downloading MLS listing records into database 68, from which reports may be generated and searches may be conducted. MLS data may contain inaccuracies, and MLS listing management system 10 may apply one or more validation algorithms to imported MLS data to cleanse the data and thereby produce more accurate reports. Downloading engine 55 may also directly receive MLS-generated reports and query results, which may be passed to dashboard generator 50 to be displayed and manipulated in dashboard 100.

Downloading engine 55 may be implemented as proprietary software. However, in one or more embodiments, downloading engine 55 may be implemented by one or more third party services, for example via an API. Such services may include Remine, provided by Remine, Inc. and Trestle, provided by Corelogic, Inc. Other such services, either now extant or yet to be developed, may also be used to implement downloading engine 55 as appropriate.

Dashboard generator 50 may generate and make available a myriad of reports from MLS listing data, either generated from MLS listing records 59 in database 68 or obtained directly from an MLS via downloader engine 55, thereby allowing a user to query and format activity data and graphically display trends with tremendous flexibility. For example, dashboard generator 50 may produce charts listing statuses and days-on-market, summary reports, marketing reports, comparative market analyses, and summary reports of all MLS listings. Such reports may identify selling agents and listing agents for selected properties, such as new home sales, builders, number of agents in a realtor's office, and the like, and be useful for monitoring new home listings, changes in competitive communities, and reverse prospecting. Dashboard generator 50 may provide downloadable reports compatible with off-the-shelf software products such as Excel,® Word,® Access,® et cetera.

As illustrated in FIG. 5A and FIG. 5B, dashboard generator 50 may also query MLS listing records 59 in database 68 to ascertain which listed properties have an estimated closing within seven days or less, which listed properties have an estimated completion date within seven days or less, which property listings have inadequate property remarks, which listed properties have closings that are past due, which listed properties have estimated completion dates that are past due, and which properties have been completed but have active MLS listings lacking photographs. These "action item" categories may require the MLS listings to be updated in a timely manner to avoid fines assessed by the listing MLS. One or more of these categories, among others, may be displayed in a client window on dashboard 100 or may be supplied by dashboard generator 50 as a printable report. In addition to merely listing action items in a report, dashboard generator 50 may also launch pop-up windows to ensure a user is made aware.

Server 12 may invoke dashboard generator 50 at a frequent periodic basis to query database 68 for action items. In one embodiment, a chronology table causes operating system 40 to invoke dashboard generator 50 at a specific time interval. The Linux® operating system includes this feature using the CRON command and CRONTAB file. However, other methods to periodically invoke dashboard generator 50 may be used as known to routineers of the art.

Referring back to FIG. 2, in one or more embodiments, dashboard generator 50 may provide additional functionality. For example, upper level navigation pane 102 may include a "Photo Requests" option. Dashboard generator 50 may launch a client window (not illustrated) with a form to request or view and select photographs to be included in the MLS listing for the selected property. When photographs are requested, server 12 may electronically forward the request, with supporting information (such as address, schedule, lock-box information, and special instructions), to a professional photographer selected from a list of approved photographers. Builder profiles 62 may include a list of photographers approved for that particular builder. System 12 may electronically receive photographs from photographers, and dashboard generator 50 may provide an online library for the photographs, PDF files, virtual tours, and more. Listing generator 52 may provide automatic photograph resizing based on the applicable MLS requirements.

The above disclosure cites mere examples of capability provided by dashboard generator 50; other functions may be implemented as known to routineers in the art.

Referring back to FIG. 1, in one or more embodiments, MLS listing management system 10 may receive a builder's XML or similar feed from client computer 14, which may promote automation of MLS listing management. Various XML DTDs may be used. One de facto industry standard was created by Builders Digital Experience, LLC (BDX) and is used by many production homebuilder to send data to websites. Depending on the builder's back end systems and inhouse resources, various methods may be used by a builder to generate an XML feed. For builders with robust information technology capabilities and a system that houses their marketing data, a standardized BDX XML file format may be employed. For builders that do not have a system that houses all of their community and plan marketing information in readily exportable manner, a content and data management application, BDXlive, may be used. A builder may also use an application, BDXtractor XML Screenscraper, that maps key fields from the builder's website pages into the BDX XML schema. BDXlive and BDXtractor XML Screenscraper applications are available from BDX.

XML parser 56 is ideally programmed to receive a XML feed from builder's computer 14, parse the XML feed and update MLS listing records 59, community profiles 60, builders profiles 62, and plan profiles 64 within database 68 as appropriate. As XML parsing is well known in the art, further detail is omitted for brevity. In one or more embodiments, a builder may also send data to XML parser 56 in an Excel® file, a MySQL file, or the like, using predefined templates or schemas. XML parser 56 may be configured to extract data from these formats and update MLS listing records 59, community profiles 60, builders profiles 62, and plan profiles 64 within database 68 as appropriate.

Figure 6:
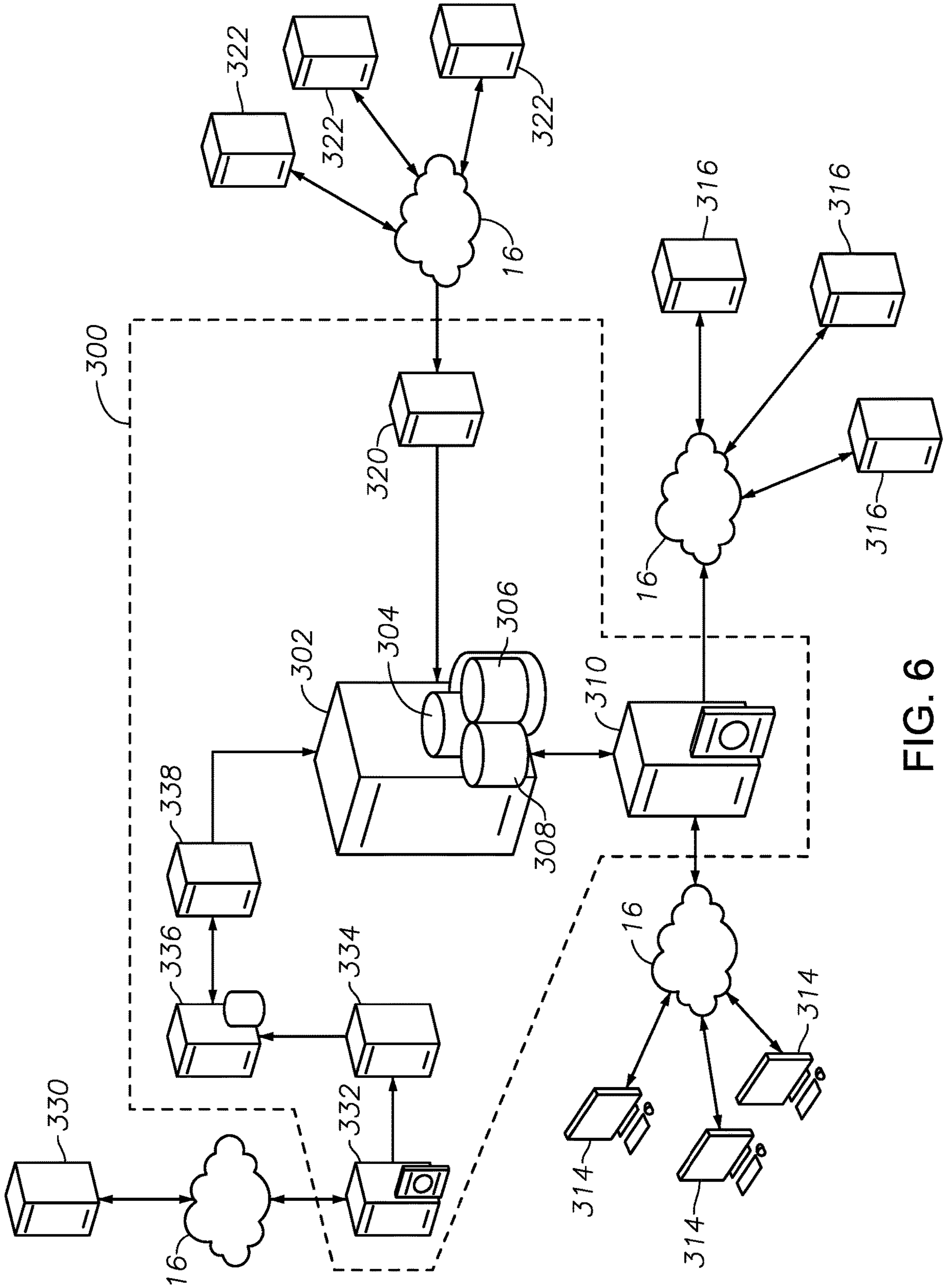
FIG. 6 is a conceptualized block diagram of a system for acquiring and managing new home data and corresponding MLS listings according to one or more embodiments.

FIG. 6 is a conceptualized block diagram of a system 300 for acquiring and managing new home data and corresponding MLS listings according to one or more embodiments. MLS listing management system 300 operates in a similar manner as MLS listing management system 10. MLS listing management system 300 includes a plurality of computer servers, which may be provided as dedicated servers or as cloud-based server services as known in the art. As is well known in the computer field, each server contains a processor which executes instructions retrieved from memory to control the reception and manipulation of input data, the transfer of data to other computers, and the output and display of data on output devices. Memory is used for storing input data, processed data, and software in the form of processor instructions. Each server includes input, output and storage devices, possibly including a video display, a removable disc drive (e.g. DVD-RW), a universal serial bus (USB), and a network interface. As this general computer technology is commonplace and well understood in the art, it is neither illustrated nor discussed further herein. Each server also includes an operating system.

MLS listing management system 300 includes a database server 302, which may include a DBMS, such as DBMS 44 described above with respect to FIG. 1, a MLS listing database 304, a community profiles database 306, and a plan profile database 308. Database server 302 may also include a builder profiles database and a MLS metadata database (not illustrated).

MLS listing management system 300 further includes a webserver 310. Webserver 310 includes a webserver application, such as webserver application 42 described above with respect to FIG. 1. Webserver 310 further includes a dashboard generator, a listing generator, and a posting engine, implemented as automated computing machinery, which may be substantially the same as dashboard generator 50, listing generator 52, and posting engine 54, respectively, as described above with respect to system 10. Webserver 310 is operatively coupled to database server 302 via a network connection. Webserver 310 is connected via internet 16 to a plurality of client computers 314, on which it selectively displays instances of a dynamic dashboard substantially as described above with reference to system 10. Webserver 310 is also connected via internet 16 to a plurality of MLS web servers 316, to which it uploads new and updated MLS listings, substantially as described above with respect to system 10.

MLS listing management system 300 further includes a downloader server 320, implemented as automated computing machinery, which may be substantially the same as downloading engine 55 as described above with respect to system 10. Downloader server 320 is in turn connected via internet 16 to a plurality of MLS RETS or MLS API servers 322. Downloader server 320 queries MLS RETS or MLS API servers 322 to receive current MLS listing data. Downloader server 320 is operatively coupled to database server 302 via a network connection for transferring MLS listing data to MLS listing database 304.

Finally, MLS listing management system 300 may include the following components, implemented as automated computing machinery, for processing incoming XML feeds from a builder server 330 via internet 16: A file transfer protocol (FTP) server 332 for receiving the XML feeds, a XML parser server 334 (having functionality of XML parser 56 of system 10, as described above), an XML database 336, and an XML Migration server 338. XML migration server 338 works with XML database 336 to format the incoming XML data into appropriate schemas for storage by database server 302.

Although MLS listing management system 300 as depicted in FIG. 6 includes a number of discrete computer servers or cloud-based server services, a routineer in the art would understand that the functions of two or more servers may be combined under a single server or service, depending on the workload, server capacity, and desired throughout.

Automated computing machinery as that term is used in this specification means a module, segment, or portion of code or other automated computing logic, hardware, software, firmware, and others, as well as combination of any of the aforementioned, as will occur to those of skill in the art—both local and remote. Automated computing machinery is often implemented as executable instructions, physical units, or other computing logic for implementing the specified logical function(s) as will occur to those of skill in the art.

The Abstract of the disclosure is solely for providing the a way by which to determine quickly from a cursory reading the nature and gist of technical disclosure, and it represents solely one or more embodiments.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A system for acquiring and managing new home data and corresponding multiple listing service listings, comprising:

one or more computer servers (12) coupled to a network (16), each of the one or more computer servers having a processor (20) and a memory (22);

one or more databases designed and arranged for storing a plurality of plan profiles (64), a plurality of community profiles (60), a plurality of builder profiles (62), and a plurality of MLS listing records (59);

a dashboard generator software module (50), implemented as a first instance of automated computing machinery and executable by the one or more servers, said dashboard generator software module operatively coupled to the one or more databases and designed and arranged to produce an instance of a dynamic web-based dashboard display (100) on a web browser running on a first remote client computer (14), said dashboard display operable to provide access to one or more of the group consisting of said plurality of plan profiles, said plurality of community profiles, and said plurality of MLS listing records;

a listing generator software module (50), implemented as a second instance of automated computing machinery and executable by the one or more servers, said listing generator software module operatively coupled to said dashboard generator software module and said one or more databases, said listing generator software module designed and arranged to pre-populate one or more fields of a first of the plurality of MLS listing records with data extracted from the group consisting of one or more of the plurality of plan profiles and one or more of the plurality of community profiles; and a posting engine software module (54), implemented as a third instance of automated computing machinery and executable by the one or more servers, said posting engine software module operatively coupled to said dashboard generator software module, said listing generator software module, and said one or more databases, said posting engine software module designed and arranged to transfer the first of the plurality of MLS listing records to a first multiple listing service computer server (13) over the network.

2. The system of claim 1 further comprising:

a downloading engine software module (55) designed and arranged to receive a second of the plurality of MLS listing records from the first multiple listing service computer server and store the second of the plurality of MLS listing records in said one or more databases.

3. The system of claim 1 wherein:

said one or more databases is designed and arranged for storing MLS metadata (66);

said one or more computer servers is coupled via the network to a second multiple listing service computer server (13); and said posting engine software module is designed and arranged to query said MLS metadata and format said first of the plurality of MLS listing records to be compatible with said first multiple listing service computer server.

4. The system of claim 1 wherein:

said posting engine software module formats and transfers said first of the plurality of MLS listing records in accordance with the Real Estate Transaction Standard.

5. The system of claim 1 wherein:

said posting engine software module formats and transfers said first of the plurality of MLS listing records via a Real Estate Standards Organization web application programming interface.

6. The system of claim 1 wherein:

a first of the one or more databases is designed and arranged for storing geographical data; and at least one of said plurality of community profiles includes data that is stored in the first of the one or more databases using a spatial data type.

7. The system of claim 1 wherein:

said one or more databases is designed and arranged for storing a plurality of builder profiles (62);

said dashboard display is operable to provide access to said plurality of builder profiles; and said listing generator software module is designed and arranged to pre-populate the one or more fields of the first of the plurality of MLS listing records with data extracted from the plurality of builder profiles.

8. The system of claim 1 further comprising:

an extensible markup language parser software module (56), implemented as a fourth instance of automated computing machinery and executable by the one or more servers, said extensible markup language parser software module operatively coupled to said listing generator software module and said one or more databases, said extensible markup language parser software module designed and arranged to receive and parse a data feed from a second remote client computer into one or more of said plurality of MLS listing records and store said one or more of said plurality of MLS listing records in said one or more databases.

9. The system of claim 8 wherein:

said data feed includes an extensible markup language standard created by Builders Digital Experience, LLC.

10. The system of claim 8 wherein:

said listing generator software module is designed and arranged to pre-populate the one or more fields of the first of the plurality of MLS listing records with data extracted from the data feed.

11. A method for acquiring and managing new home data and corresponding multiple listing service listings, comprising the steps of:

storing a plurality of plan profiles (64), a plurality of community profiles (60), a plurality of builder profiles, and a plurality of MLS listing records (59) in one or more databases using a computerized database management system (44);

producing an instance of a dynamic web-based dashboard display (100) on a web browser running on a first remote client computer (14) by a dashboard generator software module (50), implemented as a first instance of automated computing machinery and executable by one or more computer servers (12), said dashboard display operable to provide access to one or more of the group consisting of said plurality of plan profiles, said plurality of community profiles, said builder profiles, and said plurality of MLS listing records;

pre-populating one or more fields of a first of the plurality of MLS listing records with data extracted from the group consisting of one or more of the plurality of plan profiles, one or more of the plurality of community profiles, and one or more the builder profiles by a listing generator software module (50) implemented as a second instance of automated computing machinery and executable by the one or more computer servers; and transferring the first of the plurality of MLS listing records to a multiple listing service computer server (13) over a network by a posting engine software module (54) implemented as a third instance of automated computing machinery and executable by the one or more computer servers.

12. The method of claim 11 further comprising the step of:

receiving by a downloading engine software module (55) a second of the plurality of MLS listing records from the multiple listing service computer server and storing said second of the plurality of MLS listing records in said one or more databases.

13. The method of claim 11 further comprising the steps of:

storing MLS metadata (66) in the one or more databases using the computerized database management system;

querying said MLS metadata by said posting engine software module; and formatting said first of the plurality of MLS listing records to be compatible with said multiple listing service computer server.

14. The method of claim 11 further comprising the steps of:

formatting and transferring by said posting engine software module the first of the plurality of MLS listing records in accordance with the Real Estate Transaction Standard.

15. The method of claim 11 further comprising the steps of:

formatting and transferring by said posting engine software module the first of the plurality of MLS listing records via a Real Estate Standards Organization web application programming interface.

16. The method of claim 11 further comprising the step of:

storing at least one said plurality of community profiles in a first of the one or more databases using a spatial data type; wherein the first of the one or more databases is designed and arranged for storing geographical data.

17. The method of claim 11 further comprising the steps of:

storing a plurality of builder profiles (62) in said one or more databases using the computerized database management system;

providing access to said plurality of builder profiles on said dashboard display by said dashboard generator software module; and pre-populating by said listing generator software module the one or more fields of the first of the plurality of MLS listing records with data extracted from the plurality of builder profiles.

18. The method of claim 11 further comprising the steps of:

receiving a data feed from a second remote client computer by an extensible markup language parser software module (56) implemented as a fourth instance of automated computing machinery and executable by the one or more servers;

parsing by the extensible markup language parser software module the data feed into one or more of said plurality of MLS listing records; and storing using the computerized database management system the one or more of said plurality of MLS listing records in the one or more databases.

19. The method of claim 18 wherein:

said data feed includes an extensible markup language standard created by Builders Digital Experience, LLC.

20. The method of claim 18 further comprising the step of:

pre-populating by said listing generator software module the one or more fields of the first of the plurality of MLS listing records with data extracted from the data feed.

* * * * *